United States Patent
Bondarevsky et al.

(10) Patent No.: US 12,392,246 B2
(45) Date of Patent: Aug. 19, 2025

(54) AIRFOIL COOLING CIRCUIT

(71) Applicant: Raytheon Technologies Corporation, Farmington, CT (US)

(72) Inventors: Dana K. Bondarevsky, Sturbridge, MA (US); Dominic J. Mongillo, Jr., West Hartford, CT (US); Christopher Paul Perron, Tolland, CT (US); Yuta Yoshimura, Meriden, CT (US); David D. Chapdelaine, Ellington, CT (US)

(73) Assignee: RTX Corporation, Farmington, CT (US)

( * ) Notice: Subject to any disclaimer, the term of this patent is extended or adjusted under 35 U.S.C. 154(b) by 38 days.

(21) Appl. No.: 18/208,689

(22) Filed: Jun. 12, 2023

(65) Prior Publication Data

US 2024/0410283 A1    Dec. 12, 2024

(51) Int. Cl.
*F01D 5/18* (2006.01)

(52) U.S. Cl.
CPC ........ *F01D 5/187* (2013.01); *F05D 2240/301* (2013.01); *F05D 2260/221* (2013.01)

(58) Field of Classification Search
CPC .... F01D 5/187; F01D 5/186; F05D 2260/202; F05D 2260/201; F05D 2260/221; F05D 2240/301; F05D 2260/2212
See application file for complete search history.

(56) References Cited

U.S. PATENT DOCUMENTS

| | | | |
|---|---|---|---|
| 5,096,379 A | 3/1992 | Stroud et al. | |
| 5,403,159 A | 4/1995 | Green et al. | |
| 5,902,093 A * | 5/1999 | Liotta | F01D 5/187 |
| | | | 415/121.2 |
| 6,168,381 B1 * | 1/2001 | Reddy | F01D 5/186 |
| | | | 416/97 R |
| 6,595,748 B2 * | 7/2003 | Flodman | F01D 5/186 |
| | | | 415/115 |
| 7,104,757 B2 | 9/2006 | Gross | |
| 7,186,082 B2 | 3/2007 | Mongillo et al. | |
| 7,377,747 B2 * | 5/2008 | Lee | F01D 5/3007 |
| | | | 416/97 R |
| 7,766,619 B2 | 8/2010 | Fokine et al. | |
| 7,967,563 B1 | 6/2011 | Liang | |

(Continued)

OTHER PUBLICATIONS

Extended European Search Report for EP Application No. 24174889.6, dated Jul. 2, 2024, 11 pages.

(Continued)

*Primary Examiner* — Courtney D Heinle
*Assistant Examiner* — Andrew Thanh Bui
(74) *Attorney, Agent, or Firm* — Kinney & Lange, P.A.

(57) ABSTRACT

An airfoil for a gas turbine engine includes a first wall disposed in an interior cavity, the first wall extending in the spanwise direction from a base region to a tip wall and adjoining a pressure side wall and a suction side wall to form a first cooling channel; a second wall disposed in the interior cavity and extending in a chordwise direction from the first wall toward a trailing edge, the second wall adjoining the pressure side wall and the suction side wall to form a second cooling channel; a first hole through the first wall, the first hole connecting the first cooling channel to the second cooling channel; and a second hole though the second wall connecting the second cooling channel to a third cooling channel.

20 Claims, 4 Drawing Sheets

(56) References Cited

U.S. PATENT DOCUMENTS

| | | | |
|---|---|---|---|
| 8,202,054 B2* | 6/2012 | Liang | F01D 5/188 |
| | | | 416/97 R |
| 8,337,158 B1* | 12/2012 | Liang | F01D 5/20 |
| | | | 29/889.1 |
| 8,757,974 B2* | 6/2014 | Propheter-Hinckley | ..................... |
| | | | F01D 5/188 |
| | | | 416/97 R |
| 10,190,420 B2 | 1/2019 | King et al. | |
| 10,683,763 B2 | 6/2020 | Halfmann et al. | |
| 10,718,219 B2 | 7/2020 | Meier et al. | |
| 2016/0160657 A1 | 6/2016 | Lewis et al. | |
| 2019/0178087 A1 | 6/2019 | Meier et al. | |
| 2022/0178261 A1 | 6/2022 | Fanelli et al. | |

OTHER PUBLICATIONS

Extended European Search Report for European Patent Application No. 24169995.8, Dated Jul. 9, 2024, 15 Pages.

* cited by examiner

AIRFOIL COOLING CIRCUIT

STATEMENT OF GOVERNMENT INTEREST

This invention was made with Government support and the Government has certain rights in this invention.

BACKGROUND

The present disclosure relates generally to cooling components of gas turbine engines and more particularly to airfoil cooling circuits.

Hollow airfoils of a turbine section of a gas turbine engine can require internal structures to achieve a desired cooling air flow while reducing stress concentrations. Improved cooling circuits and structures are needed to address both heat transfer and stress reduction.

SUMMARY

In one aspect, an airfoil for a gas turbine engine includes a body defining and internal cavity, the body having a pressure side wall and a suction side wall, a tip wall extending in the chordwise direction between the pressure side wall and the suction side wall and defining a radially outer boundary of the internal cavity in the tip region, a first wall disposed in the interior cavity and extending in the spanwise direction to form a first cooling channel, a second wall disposed in the interior cavity and extending in the chordwise direction from the first wall toward the trailing edge to form a second cooling channel, a first hole through the first wall connecting the first cooling channel to the second cooling channel, and a second hole though the second wall connecting the second cooling channel to a third cooling channel. An area of the first hole is sized to provide all of a cooling fluid flow received in the second cooling channel and an area of the second hole is at least 80 percent of the area of the first hole.

In another aspect, a turbine blade for use in a gas turbine engine includes a root portion comprising a plurality of cooling channels configured to receive a cooling fluid, a platform disposed adjacent to the root portion, and an airfoil disposed adjacent to the platform. The airfoil includes a pressure side wall and a suction side wall extending in a spanwise direction from a base region adjacent to the platform to a tip region and extending in a chordwise direction from a leading edge to a trailing edge, and a tip wall extending in the chordwise direction between the pressure side wall and the suction side wall. The airfoil further includes an internal cooling circuit formed by a plurality of walls and cross-over holes including: first, second, and third walls, and first and second crossover holes. The first wall is spaced from the leading edge and extends in the spanwise direction from the root to the tip wall and adjoins the pressure side wall, the suction side wall, and the tip wall to form a leading edge cooling channel. The second wall is spaced from the tip wall and extends in the chordwise direction from the first wall to the trailing edge. The second wall adjoining the pressure side wall, the suction side wall, and the first wall to form a tip flag cooling channel. The third wall is spaced from the first wall and extends in the spanwise direction from the root to the second wall. The third wall adjoins the pressure side wall, the suction side wall, the second wall to form a first cooling channel of a serpentine cooling circuit. The first crossover hole is through the first wall connecting the leading edge cooling channel to the tip flag cooling channel. The second crossover hole is though the second wall connecting the tip flag cooling channel to a second cooling channel of the serpentine cooling circuit. The third crossover hole is through the third wall connecting the first and second cooling channels of the serpentine cooling circuit.

In yet another aspect, a method of providing internal cooling to airfoil in a gas turbine engine is disclosed. The airfoil has a pressure side wall and a suction side wall, the pressure side wall and the suction side wall extending in a spanwise direction from a base region to a tip region and in a chordwise direction from a leading edge to a trailing edge and defining and internal cooling circuit therebetween. The method includes conveying a cooling fluid in the spanwise direction from the base region to the tip through a leading edge channel, conveying the cooling fluid through a crossover hole in a leading edge partition wall to a tip flag channel, the tip flag channel defined between a tip wall and a tip partition wall and extending in a chordwise direction from the leading edge partition wall to the trailing edge, conveying the cooling fluid in the spanwise direction from the base region to the tip partition wall through a first channel of a serpentine cooling circuit, the first channel disposed adjacent to the leading edge channel, conveying the cooling fluid from the tip flag channel through a crossover hole in the tip partition wall to a second channel of the serpentine cooling circuit, and conveying the cooling fluid from the first channel of the serpentine cooling circuit through a crossover hole in a first internal partition wall to the second channel of the serpentine cooling circuit.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

Figure 1:
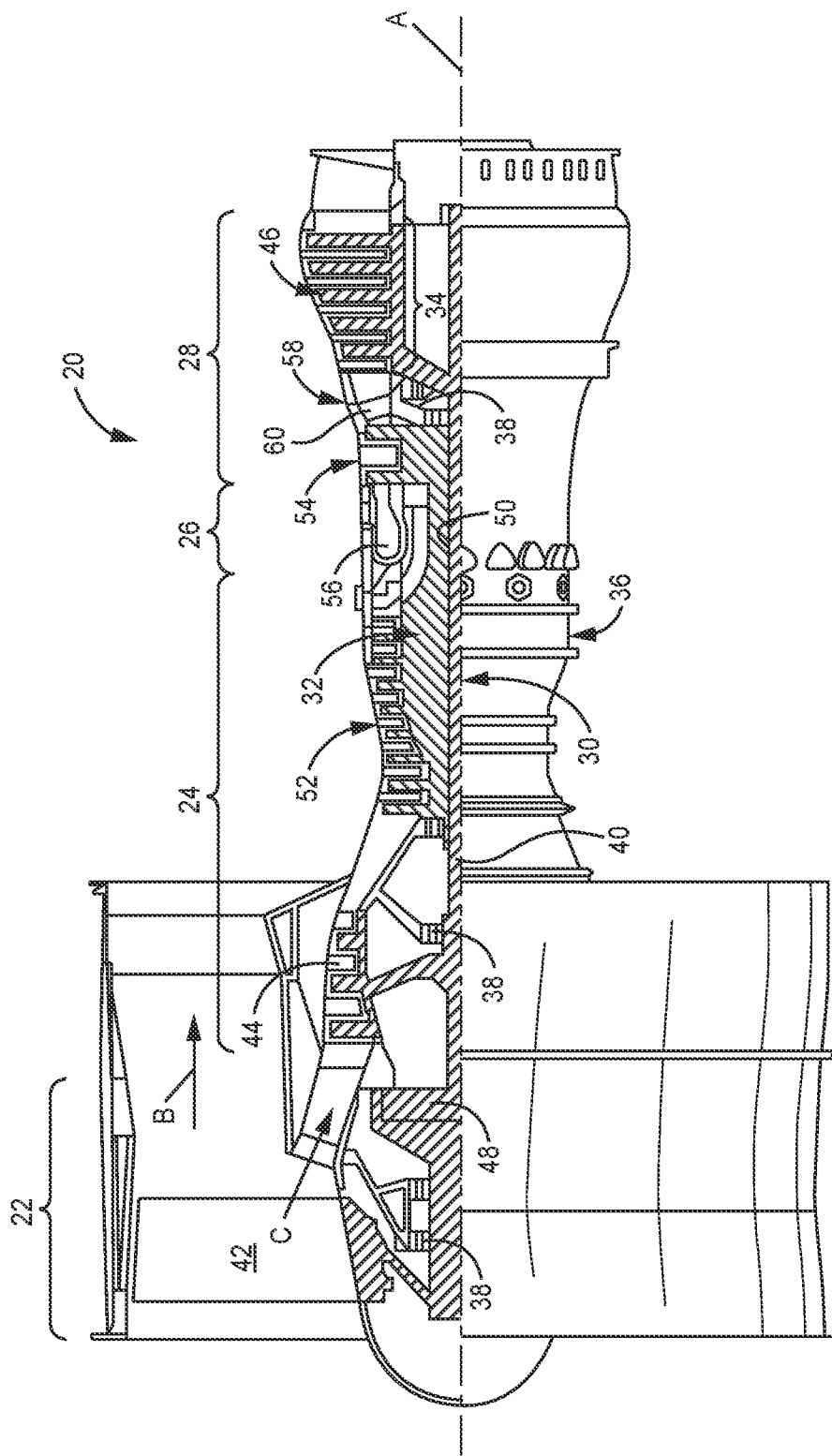
FIG. 1 is a quarter-sectional view of a gas turbine engine.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

The present disclosure is directed to an airfoil cooling circuit arrangement with integral flow control features provided to improve flow distribution and thermal cooling performance. The disclosed airfoil cooling circuit has crossover supported cores or channels configured to eliminate dead end internal cavity walls in the tip region. The disclosed airfoil includes crossover holes to connect a leading edge channel to a tip flag channel, to connect channels of a serpentine circuit, and to connect the tip flag channel to the serpentine circuit. The disclosed airfoil provides increased wall thicknesses or wall area in regions of the airfoil that experience high metal temperatures and high thermal mechanical stress during operation.

FIG. 1 is a quarter-sectional view of a gas turbine engine 20 that includes fan section 22, compressor section 24, combustor section 26 and turbine section 28. Fan section 22 drives air along bypass flow path B while compressor section 24 draws air in along core flow path C where air is compressed and communicated to combustor section 26. In combustor section 26, air is mixed with fuel and ignited to generate a high pressure exhaust gas stream that expands through turbine section 28 where energy is extracted and utilized to drive fan section 22 and compressor section 24.

Although the disclosed non-limiting embodiment depicts a turbofan gas turbine engine, it should be understood that the concepts described herein are not limited to use with turbofans as the teachings may be applied to other types of turbine engines; for example a low-bypass turbine engine, or a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes low speed spool 30 and high speed spool 32 mounted for rotation about an engine central longitudinal axis A relative to an engine static structure 36 via several bearing systems 38. It should be understood that various bearing systems 38 at various locations may alternatively or additionally be provided.

Low speed spool 30 generally includes inner shaft 40 that connects fan 42 and low pressure (or first) compressor section 44 to low pressure (or first) turbine section 46. Inner shaft 40 drives fan 42 through a speed change device, such as geared architecture 48, to drive fan 42 at a lower speed than low speed spool 30. High-speed spool 32 includes outer shaft 50 that interconnects high pressure (or second) compressor section 52 and high pressure (or second) turbine section 54. Inner shaft 40 and outer shaft 50 are concentric and rotate via bearing systems 38 about engine central longitudinal axis A.

Combustor 56 is arranged between high pressure compressor 52 and high pressure turbine 54. In one example, high pressure turbine 54 includes at least two stages to provide a double stage high pressure turbine 54. In another example, high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of low pressure turbine 46 as related to the pressure measured at the outlet of low pressure turbine 46 prior to an exhaust nozzle.

Mid-turbine frame 58 of engine static structure 36 is arranged generally between high pressure turbine 54 and low pressure turbine 46. Mid-turbine frame 58 further supports bearing systems 38 in turbine section 28 as well as setting airflow entering low pressure turbine 46.

The core airflow C is compressed by low pressure compressor 44 then by high pressure compressor 52 mixed with fuel and ignited in combustor 56 to produce high speed exhaust gases that are then expanded through high pressure turbine 54 and low pressure turbine 46. Mid-turbine frame 58 includes airfoils/vanes 60, which are in the core airflow path and function as an inlet guide vane for low pressure turbine 46. Utilizing vanes 60 of mid-turbine frame 58 as inlet guide vanes for low pressure turbine 46 decreases the length of low pressure turbine 46 without increasing the axial length of mid-turbine frame 58. Reducing or eliminating the number of vanes in low pressure turbine 46 shortens the axial length of turbine section 28. Thus, the compactness of gas turbine engine 20 is increased and a higher power density may be achieved.

Each of the compressor section 24 and the turbine section 28 can include alternating rows of rotor assemblies and vane assemblies (shown schematically) that carry airfoils that extend into the core flow path C. To improve efficiency, static outer shroud seals (shown in FIG. 2), such as a blade outer air seal (BOAS), can be located radially outward from rotor airfoils to reduce tip clearance and losses due to tip leakage.

Figure 2:
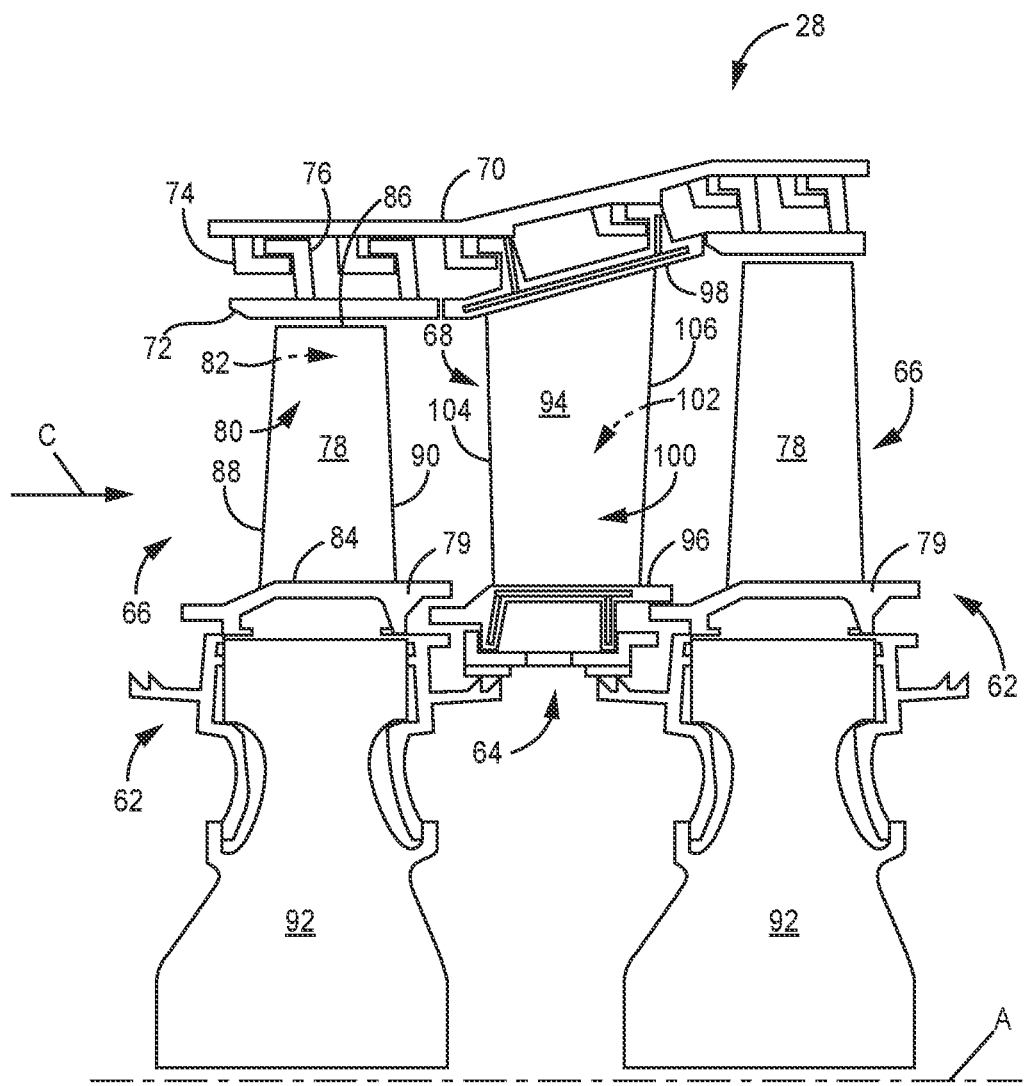
FIG. 2 is a schematized cross-sectional view of a turbine section of the gas turbine engine of FIG. 1.

FIG. 2 is a schematized view of a portion of turbine section 28 that may employ various embodiments disclosed herein. Turbine section 28 includes alternating rows of rotor assemblies 62 and vane assemblies 64. Rotor assemblies 62 include a plurality of rotor blades 66 that extend into core flow path C. Vane assembly 64 includes a plurality of stationary vanes 68 that extend into core flow path C. Turbine section 28 is housed within a case 70, which can include multiple parts (e.g., turbine case, diffuser case, etc.). In various locations, components, such as seals, may be positioned between blades 66, vanes 68, and case 70. For example, BOAS 72 are located radially outward from blade 66. BOAS 72 can include BOAS supports that are configured to fixedly connect or attach BOAS 72 to case 70. For example, case 70 can include a plurality of hooks 74 that engage with BOAS hooks 76 to secure the BOAS 72 between case 70 and a tip of blade 66.

Blades 66 include airfoil body 78 and platform 79. Airfoil body includes pressure side wall 80, suction side wall 82, base region 84, tip 86, leading edge 88, and trailing edge 90. Pressure side wall 80 is disposed opposite suction side wall 82. Pressure side wall 80 and suction side wall 82 each extend radially from base region 84 toward tip 86. As used herein, the term "radial" refers to an orientation perpendicular to engine axis A. Pressure side wall 80 and suction side 82 each extend generally axially and/or tangentially (e.g., with respect to engine axis A) between leading edge 88 and trailing edge 90. Each of base region 84 and tip 86 extend from leading edge 88 to trailing edge 90 at an innermost radial extent and an outermost radial extent of airfoil body 78. Platform 79 joins airfoil body 78 at base region 84. Platform 79 forms an inner diameter boundary of core airflow C. Blades 66 are joined to rotor disks 92. Each blade 66 can include a root portion (not shown) received in rotor disk 92.

Vanes 68 include airfoil body 94, inner diameter platform 96, and outer diameter platform 98. Airfoil body 94 includes pressure side wall 100, suction side wall 102, leading edge 104, and trailing edge 106. Airfoil 94 extends radially from inner diameter platform 96 to outer diameter platform 98. Inner and outer diameter platforms 96, 98 form inner and outer boundaries for core airflow C.

Blades 66 and vanes 68 are hollow bodies with internal cavities. Internal cavities can include one or more cooling circuits defined by a plurality of cores or channels and flow passages configured to direct a cooling fluid. The channels can be separated by walls disposed in the internal cavity. Walls can extend, for example, radially or in a spanwise direction between base region 84 and tip 86 of blades 66, joining pressure side wall 80 and suction side wall 82 to form radially extending channels. Walls can extend a full or partial radial span of airfoils 78 and 94. Walls can additionally or alternatively extend axially or in a chordwise direction between leading edge 88 and trailing edge 90 of blade 66, joining pressure side wall 80 and suction side wall 82 to form axially extending channels. Channels can be fluidly connected via turns or crossover holes through walls to form a cooling fluid flow path through blade 66 or vane 68. Cooling fluid can be provided to the internal cavity of blades 66 via one or more openings in a base of blade 66 (e.g., through a root of the blade). A cooling fluid supply channel can extend through disk 92 and a root of blade 66 to convey cooling fluid to the internal cooling circuit. Cooling fluid can be separately provided to the internal cavity of vanes 68 via one or more openings in outer diameter platform 98.

Figure 3:
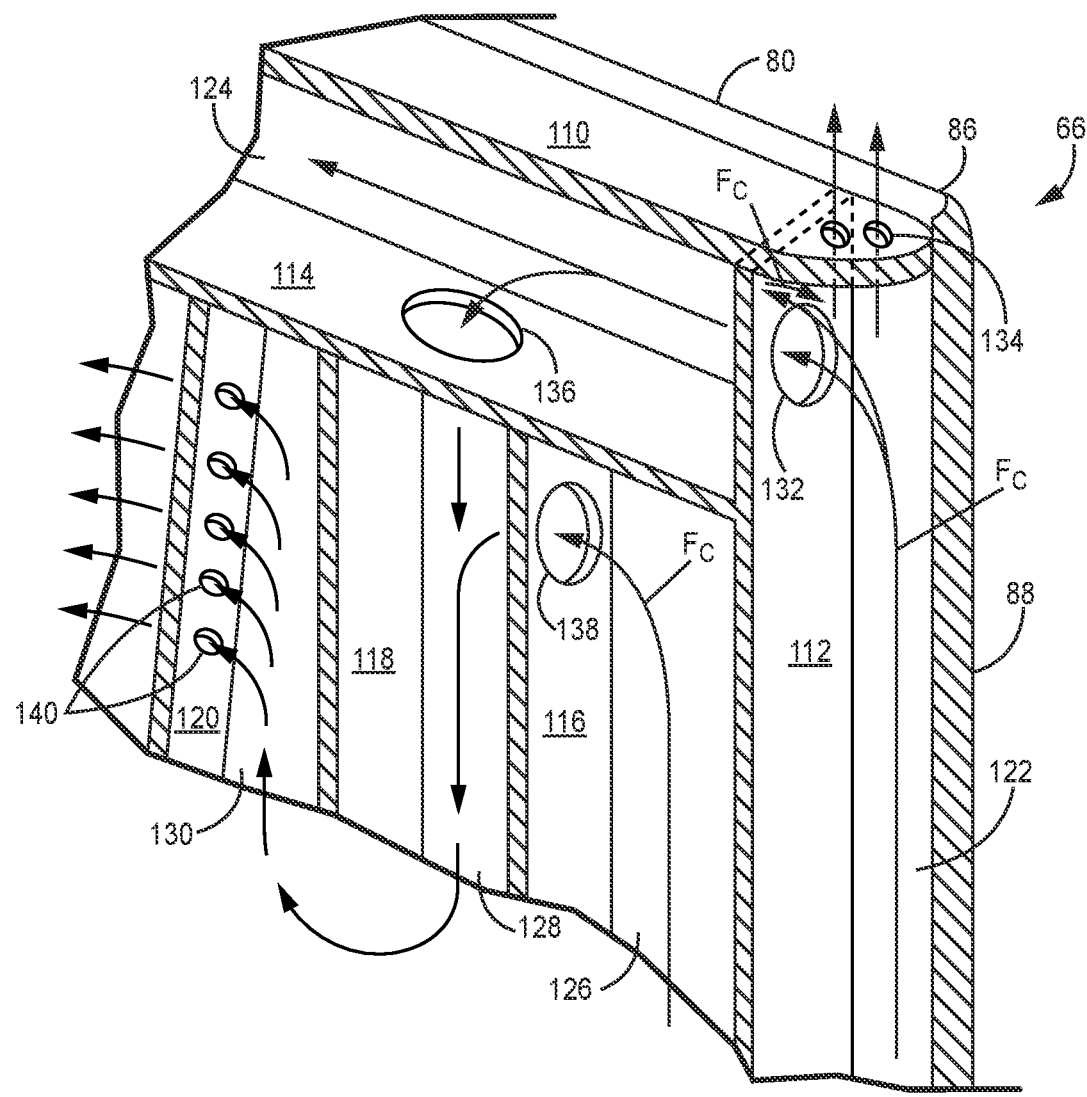
FIG. 3 is a schematized partial cutaway view of a simplified airfoil of the turbine section of FIG. 2.

FIG. 3 is a schematic partial cutaway view of one embodiment of blade 66 including an internal cooling circuit defined by plurality of cores or channels. Blade 66, pressure side wall 80, tip 86, leading edge 88, tip wall 110, leading edge partition wall 112, tip partition wall 114, first internal partition wall 116, second internal partition wall 118, third internal partition wall 120, leading edge channel 122, tip flag channel 124, first internal channel 126, second internal channel 128, third internal channel 130, leading edge channel crossover hole 132, tip holes 134, tip channel crossover hole 136, internal channel crossover hole 138, trailing edge crossover holes 140, and cooling flow Fc are shown. Suction side wall 82 is removed to show internal features. FIG. 3 is a schematic representation of an internal cooling circuit. The internal cooling circuit may include additional features not shown and/or alternative features or configurations as described herein. The features of FIG. 3 are not necessarily drawn to scale.

Figure 4:
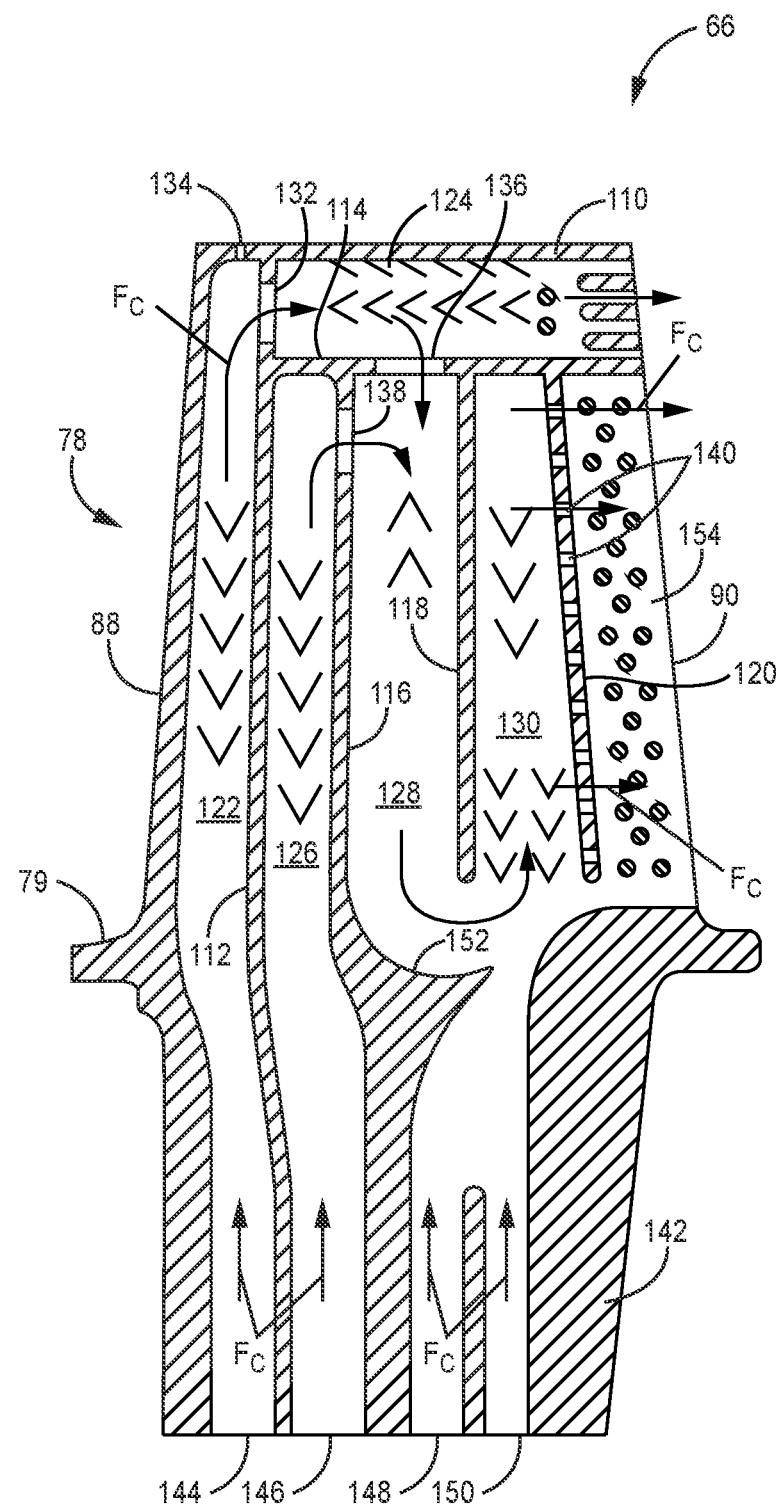
FIG. 4 is a cross-sectional view of the airfoil of FIG. 3

FIG. 4 is a cross-sectional schematic view of blade 66. FIG. 4 shows airfoil 78, platform 79, root portion 142, tip 86, leading edge 88, trailing edge 90, tip wall 110, leading edge partition wall 112, tip partition wall 114, first internal partition wall 116, second internal partition wall 118, third internal partition wall 120, leading edge channel 122, tip flag channel 124, first internal channel 126, second internal channel 128, third internal channel 130, leading edge channel crossover hole 132, tip holes 134, tip channel crossover hole 136, internal channel crossover hole 138, trailing edge crossover holes 140, inlets 144, 146, 148, and 150, curved surface 152, trailing edge cavity 154, and cooling flow Fc. FIG. 4 is a schematic representation of the internal cooling circuit. The internal cooling circuit may include additional features not shown and/or alternative features or configurations as described herein. The features of FIG. 4 are not necessarily drawn to scale. FIGS. 3 and 4 are discussed together herein.

Tip wall 110 extends from leading edge 88 to trailing edge 90 and from pressure side wall 80 to suction side wall 82 to define a radially outermost boundary of the internal cooling circuit of blade 66. Tip wall 110 can include tip holes 134 connecting the internal cooling circuit to the exterior of blade 66 to exhaust cooling fluid from the internal cooling circuit. Tip holes 134 can be disposed adjacent leading edge 88 to exhaust the cooling fluid from leading edge channel 122. Tip wall 110 can be radially recessed from tip 86 (i.e., a radially outermost extent of pressure side wall 80 and suction side wall 82) to form a tip squealer pocket extending from leading edge 88 toward trailing edge 90.

Leading edge partition wall 112 extends radially or in a spanwise direction from root portion 142 to tip wall 110. Leading edge partition wall 112 can extend substantially parallel to leading edge 88. Leading edge partition wall 112 adjoins suction side wall 82, pressure side wall 80, and tip wall 110. Leading edge partition wall 112 is axially spaced from leading edge 88, such that leading edge 88, leading edge partition wall 112, pressure side wall 80, and suction side wall 82 define a radially extending leading edge channel 122 through which a cooling fluid can be provided. Tip wall 110 defines a radially outermost boundary of leading edge channel 122. Leading edge partition wall 112 includes leading edge channel crossover hole 132. Leading edge channel crossover hole 132 is disposed adjacent to tip wall 110 and configured to convey cooling fluid from leading edge channel 122 to tip flag channel 124. Leading edge crossover hole 132 is spaced from tip wall 110, pressure side wall 80, and suction side wall 82. Leading edge channel crossover hole 132 can have a circular or non-circular shape. Leading edge channel crossover hole 132 can have a non-circular shape and incorporated by reference herein in its entirety.

Tip partition wall 114 extends axially or in a chordwise direction from leading edge partition wall 112 to trailing edge 90. Tip partition wall 114 is radially spaced from tip wall 110. Tip partition wall 114 can extend substantially parallel to tip wall 110. Tip partition wall 114 adjoins pressure side wall 80, suction side wall 82 and leading edge partition wall 112. Tip partition wall 114, together with tip wall 110, leading edge partition wall 112, and pressure and suction side walls 80, 82 form tip flag channel 124 through which cooling fluid can be provided. Tip flag channel 124 is open at trailing edge 90 to exhaust cooling fluid. Tip partition wall 114 includes tip channel crossover hole 136. Tip channel crossover hole 136 is disposed to convey cooling fluid from tip flag channel 124 to second internal channel 128 of the internal cooling circuit provided between first and second internal partition walls 116 and 118. Tip channel crossover hole 136 is spaced from pressure side wall 80, suction side wall 82, first internal partition wall 116, and second internal partition wall 118.

First internal partition wall 116, second internal partition wall 118, and third internal partition wall 120 extend radially or in a spanwise direction from tip partition wall 114 toward root 142. First and second partition walls 116 and 118 can extend substantially parallel to leading edge partition wall 112. Third internal partition wall 120 can extend substantially parallel to trailing edge 90. First, second, and third partition walls 116, 118, and 120 adjoin tip partition wall 114, pressure side wall 80, and suction side wall 82. Together, first internal partition wall 116, second internal partition wall 118, and third internal partition wall 120 can form a serpentine cooling circuit in blade 66 through which cooling fluid can be provided.

Together, first internal partition wall 116, leading edge partition wall 112, tip partition wall 114, and pressure and suction side walls 80, 82 define first internal channel 126. First internal channel 126 is immediately aft of leading edge channel 122. As used herein, "aft" refers to an axial location with respect to engine axis A and a direction of core airflow C through engine 20. Leading edge partition wall 112 extends in the spanwise direction from root 142 to tip wall 110 thereby separating a cooling flow Fc through leading edge channel 122 from a cooling flow Fc through first internal channel 126 along the span of blade 66. First internal partition wall 116 extends in the spanwise direction from root 142 to tip partition wall 114. Leading edge channel 122 and first internal channel 126 separately extend through root portion 142, opening at a base of root portion 142 at inlets 144 and 146, respectively. Inlets 144 and 146 are configured to receive a cooling fluid. Cooling fluid is separately fed to leading edge channel 122 and first internal channel 126 from inlets 144 and 146 in root portion 142.

Together, second internal partition wall 118, tip partition wall 114, first internal partition wall 116, and pressure and suction side walls 80, 82 define second internal channel 128 in the body portion of airfoil 78. Second internal channel 128 is disposed immediately aft of first internal channel 126. As previously discussed, first internal partition wall 116 extends from tip partition wall 114 through root portion 142, thereby separating first internal channel 126 from second internal channel 128 along the span of blade 66. First and second internal channels 126 and 128 are fluidly connected by internal channel crossover hole 138. Internal channel crossover hole 138 is disposed in first internal partition wall 116. Internal channel crossover hole 138 is disposed adjacent to tip partition wall 114. Internal crossover hole 138 is spaced from tip partition wall 114, pressure side wall 80, and suction side wall 82. Internal channel crossover hole 138 can have a circular or non-circular shape. As noted above with respect to leading edge channel crossover hole 132, internal channel crossover hole 138 can have a non-circular shape.

Second internal partition wall 118 extends in the spanwise direction from tip partition wall 114 toward root portion 142. Together, second internal partition wall 118, tip partition wall 114, third internal partition wall 120, and pressure and suction side walls 80, 82 define third internal channel 130. Second internal partition wall 118 extends a partial length of the internal cavity of blade 66 such that second internal channel 128 and third internal channel 130 are fluidly connected at an innermost radial extent. First internal partition wall 116 can have curved surface 152 that extends axially to define a radially innermost boundary of second internal channel 128. Curved surface 152 of first internal partition wall 116 is disposed radially inward of second internal partition wall 118 to form a cooling channel therebetween, which opens to third internal channel 130. Curved surface 152 is configured to direct flow of cooling fluid from second internal passage 128 to third internal passage 130.

Root portion 142 includes inlets 148 and 150 disposed aft of inlet 146. Inlets 148 and 150 are configured to convey a cooling fluid to internal channel 130 and trailing edge 90. Inlets 148 and 150 can convey cooling fluid through separate inlet channels, which combine in root portion 142 before opening to third internal channel 130 and trailing edge 90.

Third internal partition wall 120 extends in the spanwise direction from tip partition wall 114 toward root portion 142. Third internal partition wall 120 can include a plurality of trailing edge crossover holes 140 configured to convey cooling fluid to trailing edge cavity 154 or exhaust cooling fluid from the internal cooling circuit through trailing edge 90. Trailing edge cavity 154 is disposed aft of third internal channel 130 and extends in the spanwise direction from tip partition wall 114 to base portion 84 (shown in FIG. 2) adjacent platform 79. Trailing edge cavity 154 is open to trailing edge 90 to exhaust the cooling fluid from blade 66.

Cooling fluid can be provided to the internal cooling circuit of blade 66 through inlets 144, 146, 148, and 150 in root portion 142. Inlet 146 may or may not be metered, and inlets 148 and 150 may be open, metered, or blocked. Cooling flow Fc can be separately received in each of leading edge channel 122 and first internal channel 126 via inlets 144 and 146, respectively. Cooling flow Fc is conveyed in a radial or spanwise direction toward tip wall 110. Cooling fluid Fc from leading edge channel 122 is conveyed to tip flag channel 124 via leading edge channel crossover hole 132. A portion of cooling flow Fc through leading edge channel 122 is exhausted through tip holes 134. Cooling flow Fc moves in an axial or chordwise direction in tip flag channel 124. A portion of cooling flow Fc from tip flag channel 124 can be conveyed to second internal channel 128 through tip channel crossover hole 136. Tip channel crossover hole 136 can be sized to convey a majority of cooling flow Fc received from leading edge channel 122 to second internal channel 128. A portion of cooling flow Fc can be conveyed through tip flag channel to trailing edge 90 for convective cooling of a tip region of airfoil 78. Cooling fluid Fc is exhausted through trailing edge 90.

Cooling flow Fc supplied to first internal channel 126 via inlet 146 is conveyed in a radial direction toward tip partition wall 114. Cooling flow Fc in first internal channel 126 is conveyed to second internal channel 128 via internal channel crossover hole 138 near tip partition wall 114. Cooling flow Fc in second internal channel 128 received from tip flag channel 124 and first internal channel 126 is conveyed in a radial direction toward base region 84 (shown in FIG. 2) of airfoil 78. Cooling flow Fc turns at an innermost radial extent of second internal partition wall 118 and curved surface 152 of first internal partition wall 116 and is directed radially outward toward tip partition wall 114 in third internal channel 130. Cooling flow Fc in third internal channel 130 is conveyed to trailing edge cavity 154 via trailing edge crossover holes 140 and out of trailing edge 90. Third internal channel 130 may additionally receive cooling flow Fc from inlets 148 and 150 in root portion 142. Cooling flow Fc is directed from inlets 148 and 150 radially outward toward tip partition wall 114. Curved surface 152 of first internal partition wall 116 can be configured to direct cooling flow Fc toward third internal channel 130 and trailing edge cavity 154.

Leading edge partition wall 112 extends fully to tip wall 110 to provide internal cooling of tip 86 at leading edge 88. This region can experience high thermal loads and mechanical stress during operation. As illustrated in FIG. 3, a portion of cooling flow Fc is back pressured by leading edge partition wall 112 above and around leading edge channel crossover hole 132, providing back pressure and cooling in the region of tip 86 and promoting the flow of cooling fluid to the outside corner of leading edge cooling channel 122 and improved convective heat transfer in this region of the tip. Leading edge channel crossover hole 132 can provide an improvement over prior art turns formed by a curved internal wall forming both the radially extending leading edge cooling channel and the axial extending tip flag channel, which can fail to provide adequate cooling of the outside corner of the channel formed by the leading edge and tip wall. The additional cooling provided by extending leading edge partition wall 112 to tip wall 110 can reduce a local thermal mechanical strain in this region. Additionally, mechanical stresses associated with dead-ended internal walls (walls that are discontinued with an end separated from an adjacent channel wall) are reduced by extending leading edge partition wall 112 to tip wall 110 and utilizing leading edge channel crossover hole 132 to convey cooling fluid Fc to tip flag channel 124. The extension of leading edge partition wall 112 to tip wall 110 allows mechanical stresses to be distributed all the way to tip wall 110.

Leading edge channel crossover hole 132 has an area sized to provide a desired cooling flow Fc to tip flag channel 124. Leading edge channel crossover hole 132 is sized to convey substantially all or the majority of cooling fluid in leading edge channel 122 to tip flag channel 124. Leading edge channel crossover hole 132 is smaller than a forward most area of tip flag channel 124 to provide back pressure cooling in the tip region at leading edge 88. Leading edge channel crossover hole 132 has a minimum size defined by a desired pressure drop across leading edge channel crossover hole 132. As used herein, "substantially all" refers to cooling fluid Fc not used for film cooling of external surfaces or tip cooling (i.e., via tip holes 134). As shown in FIG. 3, a portion of cooling flow Fc is exhausted from leading edge channel 122 through tip holes 134. A small portion of cooling flow Fc can also be used for film cooling in the region of leading edge 88, exiting leading edge channel 122 through film cooling holes (not shown). Leading edge channel crossover hole 132 can be disposed closer to tip wall 110 than to tip partition wall 114 to cool tip wall 110 adjacent to leading edge partition wall 112 in tip flag channel 124. Leading edge channel crossover hole 132 is spaced radially inward of tip wall 110 a distance selected to provide effective back pressure and cooling in the tip region at leading edge 88 and improved convective heat transfer in this region of airfoil 78. Leading edge channel crossover hole 134 can be disposed closer to pressure side wall 80 than to suction side wall 82. During operation of blade 66, higher mechanical stress can be observed at suction side wall 82 of blade 66 adjacent to leading edge partition wall 112. Leading edge channel crossover hole 132 can be disposed closer to pressure side wall 80 to provide additional leading edge partition wall thickness in a region adjacent to suction side wall 82. Leading edge channel crossover hole 132 is sized to supply all of cooling fluid Fc received in tip channel 124.

Internal channel crossover hole 138 is disposed adjacent to tip partition wall 114. Internal channel crossover hole 138 can be spaced from tip partition wall to provide back pressure cooling of the outermost radial extent of first internal channel 126 provided by cooling flow impinging first internal partition wall 116 above internal channel crossover hole 138. Internal channel crossover hole 138 can provide an improvement over designs incorporating a dead end first partition wall (i.e., partition wall that does not fully extend to tip partition wall 114). By extending first internal partition wall 112 to tip partition wall 114 and utilizing internal channel crossover hole 138 to convey cooling fluid Fc to second internal channel 128, mechanical stresses can be distributed across first partition wall 112 to tip partition wall 114 and promote cooling flow Fc filling of first internal channel 126 at tip partition wall 114. Back pressure of cooling flow Fc provided by first internal partition wall 116 can fill first internal channel 126 in the corner formed between leading edge partition wall 112 and tip partition wall 114. Internal channel crossover hole 138 can be centered on first internal partition wall 116 between pressure side wall 80 and suction side wall 82 absent increased mechanical stress on suction side wall 82 adjacent to internal channel crossover hole 138. Centering internal channel 138 can improve ease of manufacturing. Internal channel crossover hole 138 has an area sized to provide a desired cooling flow Fc to second internal channel 128. Internal channel crossover hole 138 is sized to convey substantially all cooling fluid received in first internal channel 126 via inlet 146 to second internal channel 128.

Tip channel crossover hole 136 is disposed between first internal partition wall 116 and second internal partition wall 118. Tip channel crossover hole 136 is spaced from first internal partition wall 116, second internal partition wall 118, pressure side wall 80, and suction side wall 82 to provide an increased wall thickness along pressure and suction side walls 80, 82 adjacent to tip channel crossover hole 136 and between first and second internal partition walls 116, 118 and tip channel crossover hole 136. Mechanical stresses associated with dead-ended internal walls are reduced by extending tip partition wall 114 from leading edge partition wall 112 to trailing edge 90 and utilizing tip channel crossover hole 136 to convey cooling fluid Fc to second internal channel 128. The full extension of tip partition wall 114 from leading edge partition wall 112 to trailing edge 90 can provide improved stress distribution over dead-ended partition wall designs.

Tip channel crossover hole 136 can be sized to cause preferential cooling flow Fc from leading edge channel 122 to second internal channel 128 while maintaining some cooling flow Fc to trailing edge 90. Tip channel crossover hole 136 and internal channel crossover hole 138 can be configured to convey substantially all of cooling flow Fc traveling through trailing edge crossover holes 140 and out of trailing edge 90. Cooling flow Fc through tip channel crossover hole 136 can be dependent on an outlet area of tip flag channel 124 and an outlet area of trailing edge channel 154 and can be roughly proportional to an outlet area of tip flag channel 124 and an outlet area of trailing edge channel 154 when inlets 148 and 150 are blocked. Tip channel crossover hole 136 can have an area similar to an area of leading edge channel crossover hole 132 to provide preferentially cooling flow to second internal channel 128. For example, tip channel crossover hole 136 can have an area that is at least 80 percent of an area of leading edge channel crossover hole 132.

The shape, size, and location of leading edge channel crossover hole 132, tip channel crossover hole 136, and internal channel crossover hole 138 can be selected to provide effective flow-through cooling with minimal pressure losses, provide back pressure cooling in leading edge channel 122 and second internal channel 128, and minimize the effects of thermal mechanical stress concentrations. Leading edge channel crossover hole 132, tip channel crossover hole 136, and internal channel crossover hole 138 can be shaped to provide increased wall material in areas of high mechanical stress without reducing an area required to achieve a desired cooling fluid flow. The disclosed crossover supported tip flag and serpentine core can improve airfoil cooling while reducing stress.

DISCUSSION OF POSSIBLE EMBODIMENTS

The following are non-exclusive descriptions of possible embodiments of the present invention.

An airfoil for a gas turbine engine includes a body defining and internal cavity, the body having a pressure side wall and a suction side wall, a tip wall extending in the chordwise direction between the pressure side wall and the suction side wall and defining a radially outer boundary of the internal cavity in the tip region, a first wall disposed in the interior cavity and extending in the spanwise direction to form a first cooling channel, a second wall disposed in the interior cavity and extending in the chordwise direction from the first wall toward the trailing edge to form a second cooling channel, a first hole through the first wall connecting the first cooling channel to the second cooling channel, and a second hole though the second wall connecting the second cooling channel to a third cooling channel. An area of the first hole is sized to provide all of a cooling fluid flow received in the second cooling channel and an area of the second hole is at least 80 percent of the area of the first hole.

The airfoil of the preceding paragraph can optionally include, additionally and/or alternatively, any one or more of the following features, configurations and/or additional components:

In an embodiment of the airfoil of the preceding paragraphs, the first cooling channel can be disposed adjacent to the leading edge.

In an embodiment of the airfoil of any of the preceding paragraphs, the first hole can be spaced from the pressure side wall, the suction side wall, the tip wall, and the second wall.

In an embodiment of the airfoil of any of the preceding paragraphs, the first hole can be disposed closer to the pressure side wall than the suction side wall.

An embodiment of the airfoil of any of the preceding paragraphs can further include a third wall spaced from the first wall and a fourth wall spaced from the third wall. The third and fourth walls can extend in a spanwise direction and adjoin the pressure side wall, the suction side wall, and the tip wall to form a third cooling channel between the third and fourth walls and a fourth cooling channel between the first and third walls.

In an embodiment of the airfoil of any of the preceding paragraphs, the third and fourth cooling channels can form a portion of a serpentine cooling circuit.

In an embodiment of the airfoil of any of the preceding paragraphs, the second hole can be spaced from the pressure side wall, the suction side wall, the third wall, and the fourth wall An embodiment of the airfoil of any of the preceding paragraphs can further include a third hole through the third wall connecting the fourth channel and the third channel of the serpentine circuit. The third hole can be disposed adjacent to the second wall.

In an embodiment of the airfoil of any of the preceding paragraphs, the third hole can be spaced from the pressure side wall, the suction side wall, and the second wall, and wherein the third hole can be sized to direct substantially all cooling flow from the fourth channel to the third channel.

An embodiment of the airfoil of any of the preceding paragraphs can further include a fifth wall disposed between the fourth wall and the trailing edge, the fifth wall extending in a spanwise direction and adjoining the pressure side wall, the suction side wall, and the second wall to form a fifth cooling channel. The fourth cooling channel can be open to the fifth cooling channel in the base region.

In an embodiment of the airfoil of any of the preceding paragraphs, the second hole and the third hole can be configured to provide all of the cooling fluid received in the fifth cooling channel.

In an embodiment of the airfoil of any of the preceding paragraphs, the second hole can be centered between the pressure side wall and the suction side wall.

A turbine blade for use in a gas turbine engine includes a root portion comprising a plurality of cooling channels configured to receive a cooling fluid, a platform disposed adjacent to the root portion, and an airfoil disposed adjacent to the platform. The airfoil includes a pressure side wall and a suction side wall extending in a spanwise direction from a base region adjacent to the platform to a tip region and extending in a chordwise direction from a leading edge to a trailing edge, and a tip wall extending in the chordwise direction between the pressure side wall and the suction side wall. The airfoil further includes an internal cooling circuit formed by a plurality of walls and cross-over holes including: first, second, and third walls, and first and second crossover holes. The first wall is spaced from the leading edge and extends in the spanwise direction from the root to the tip wall and adjoins the pressure side wall, the suction side wall, and the tip wall to form a leading edge cooling channel. The second wall is spaced from the tip wall and extends in the chordwise direction from the first wall to the trailing edge. The second wall adjoining the pressure side wall, the suction side wall, and the first wall to form a tip flag cooling channel. The third wall is spaced from the first wall and extends in the spanwise direction from the root to the second wall. The third wall adjoins the pressure side wall, the suction side wall, the second wall to form a first cooling channel of a serpentine cooling circuit. The first crossover hole is through the first wall connecting the leading edge cooling channel to the tip flag cooling channel. The second crossover hole is though the second wall connecting the tip flag cooling channel to a second cooling channel of the serpentine cooling circuit. The third crossover hole is through the third wall connecting the first and second cooling channels of the serpentine cooling circuit.

The turbine blade of the preceding paragraph can optionally include, additionally and/or alternatively, any one or more of the following features, configurations and/or additional components:

In an embodiment of the turbine blade of the preceding paragraphs, the third crossover hole can be disposed adjacent to the second wall.

In an embodiment of the turbine blade of any of the preceding paragraphs, the first crossover hole can be disposed closer to the tip wall than to the second wall.

In an embodiment of the turbine blade of any of the preceding paragraphs, the first cross-over hole can be disposed closer to the pressure side wall than the suction side wall.

An embodiment of the turbine blade of any of the preceding paragraphs can further include a fourth wall spaced from the third wall extending in the spanwise direction from the second wall toward the root and adjoining the pressure side wall, the suction side wall, and the second wall to form the second cooling channel of the serpentine cooling circuit. The second crossover hole can be spaced from the third wall, the fourth wall, the pressure side wall, and the suction side wall.

A method of providing internal cooling to airfoil in a gas turbine engine is disclosed. The airfoil has a pressure side wall and a suction side wall, the pressure side wall and the suction side wall extending in a spanwise direction from a base region to a tip region and in a chordwise direction from a leading edge to a trailing edge and defining and internal cooling circuit therebetween. The method includes conveying a cooling fluid in the spanwise direction from the base region to the tip through a leading edge channel, conveying the cooling fluid through a crossover hole in a leading edge partition wall to a tip flag channel, the tip flag channel defined between a tip wall and a tip partition wall and extending in a chordwise direction from the leading edge partition wall to the trailing edge, conveying the cooling fluid in the spanwise direction from the base region to the tip partition wall through a first channel of a serpentine cooling circuit, the first channel disposed adjacent to the leading edge channel, conveying the cooling fluid from the tip flag channel through a crossover hole in the tip partition wall to a second channel of the serpentine cooling circuit, and conveying the cooling fluid from the first channel of the serpentine cooling circuit through a crossover hole in a first internal partition wall to the second channel of the serpentine cooling circuit.

The method of the preceding paragraph can optionally include, additionally and/or alternatively, any one or more of the following features, configurations additional components, and/or steps:

In an embodiment of the method of the preceding paragraphs, the first crossover hole can be disposed closer to the pressure side wall than the suction side wall.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An airfoil for a gas turbine engine, the airfoil comprising:
   a body defining an internal cavity, the body having a pressure side wall and a suction side wall, the pressure side wall and the suction side wall extending in a spanwise direction from a base region to a tip region and in a chordwise direction from a leading edge to a trailing edge;
   a tip wall extending in the chordwise direction between the pressure side wall and the suction side wall and defining a radially outer boundary of the internal cavity in the tip region;
   a first wall disposed in the interior cavity, the first wall extending in the spanwise direction from the base region to the tip wall and adjoining the pressure side wall and the suction side wall to form a first cooling channel;
   a second wall disposed in the interior cavity and extending in the chordwise direction from the first wall toward the trailing edge, the second wall adjoining the pressure side wall and the suction side wall to form a second cooling channel;
   a first hole through the first wall, the first hole connecting the first cooling channel to the second cooling channel, wherein all of a cooling fluid flow in the second cooling channel is received from the first hole; and
   a second hole though the second wall connecting the second cooling channel to a third cooling channel, wherein an area of the second hole is at least 80 percent of the area of the first hole.

2. The airfoil of claim 1, wherein the first cooling channel is disposed adjacent to the leading edge.

3. The airfoil of claim 2, wherein the first hole is spaced from the pressure side wall, the suction side wall, the tip wall, and the second wall.

4. The airfoil of claim 3, wherein the first hole is disposed closer to the pressure side wall than the suction side wall.

5. The airfoil of claim 3 and further comprising:
   a third wall spaced from the first wall; and
   a fourth wall spaced from the third wall;
   wherein the third and fourth walls extend in the spanwise direction and adjoin the pressure side wall, the suction side wall, and the second wall;
   wherein the third cooling channel is formed between the third and fourth walls; and
   wherein a fourth cooling channel is formed between the first and third walls.

6. The airfoil of claim 5, wherein the third and fourth cooling channels form a portion of a serpentine cooling circuit.

7. The airfoil of claim 6, wherein the second hole is spaced from the pressure side wall, the suction side wall, the third wall, and the fourth wall.

8. The airfoil of claim 5 and further comprising a third hole through the third wall connecting the fourth channel and the third channel of the serpentine circuit, wherein the third hole is disposed adjacent to the second wall.

9. The airfoil of claim 8, wherein the third hole is spaced from the pressure side wall, the suction side wall, and the second wall, and wherein the third hole is sized to direct substantially all cooling flow from the fourth channel to the third channel.

10. The airfoil of claim 9 and further comprising a fifth wall disposed between the fourth wall and the trailing edge, the fifth wall extending in the spanwise direction and adjoining the pressure side wall, the suction side wall, and the second wall to form a fifth cooling channel, wherein the fourth cooling channel is open to the fifth cooling channel in the base region.

11. The airfoil of claim 9, wherein the second hole and the third hole are configured to provide all of the cooling fluid received in the fifth cooling channel.

12. The airfoil of claim 11, wherein the second hole is centered between the pressure side wall and the suction side wall.

13. An airfoil for a gas turbine engine, the airfoil comprising:
   a body defining an internal cavity, the body having a pressure side wall and a suction side wall, the pressure side wall and the suction side wall extending in a spanwise direction from a base region to a tip region and in a chordwise direction from a leading edge to a trailing edge;
   a tip wall extending in the chordwise direction between the pressure side wall and the suction side wall and defining a radially outer boundary of the internal cavity in the tip region;
   a first wall disposed in the interior cavity, the first wall extending in the spanwise direction from the base region to the tip wall and adjoining the pressure side wall and the suction side wall to form a first cooling channel;
   a second wall disposed in the interior cavity and extending in the chordwise direction from the first wall toward the trailing edge, the second wall adjoining the pressure side wall and the suction side wall to form a second cooling channel;
   a third wall spaced from the first wall, the third wall extending in a spanwise direction and adjoining the pressure side wall, the suction side wall, and the second wall;
   a fourth wall spaced from the third wall, the fourth wall extending in a spanwise direction and adjoining the pressure side wall, the suction side wall, and the second wall, wherein a third cooling channel is formed between the third and fourth walls and a fourth cooling channel is formed between the first and third walls, the third and fourth cooling channels forming a portion of a serpentine cooling circuit;

a first hole through the first wall, the first hole connecting the first cooling channel to the second cooling channel, wherein an area of the first hole is sized to provide all of a cooling fluid flow received in the second cooling channel;

a second hole though the second wall connecting the second cooling channel to a third cooling channel, wherein an area of the second hole is at least 80 percent of the area of the first hole; and a third hole through the third wall connecting the fourth channel and the third channel of the serpentine circuit, wherein the third hole is disposed adjacent to the second wall.

14. The airfoil of claim 13, wherein the first cooling channel is disposed adjacent to the leading edge.

15. The airfoil of claim 13, wherein the first hole is spaced from the pressure side wall, the suction side wall, the tip wall, and the second wall.

16. The airfoil of claim 13, wherein the first hole is disposed closer to the pressure side wall than the suction side wall.

17. The airfoil of claim 13, wherein the second hole is spaced from the pressure side wall, the suction side wall, the third wall, and the fourth wall.

18. The airfoil of claim 13, wherein the third hole is spaced from the pressure side wall, the suction side wall, and the second wall.

19. The airfoil of claim 13 and further comprising a fifth wall disposed between the fourth wall and the trailing edge, the fifth wall extending in the spanwise direction and adjoining the pressure side wall, the suction side wall, and the second wall to form a fifth cooling channel, wherein the fourth cooling channel is open to the fifth cooling channel in the base region.

20. The airfoil of claim 19, wherein the second hole and the third hole are configured to provide all of the cooling fluid received in the fifth cooling channel.

\* \* \* \* \*